J. L. SLATTON.
FRUIT HARVESTER.
APPLICATION FILED JAN. 12, 1914.
1,109,645.
Patented Sept. 1, 1914.
2 SHEETS—SHEET 2.
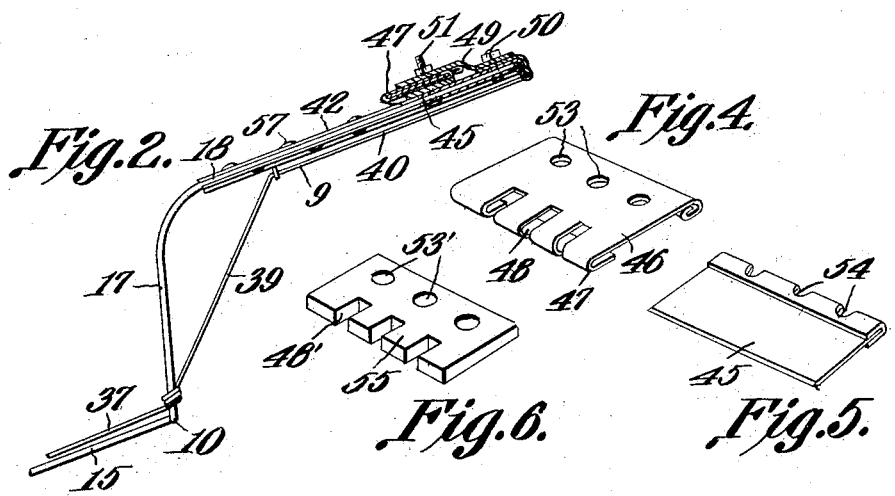
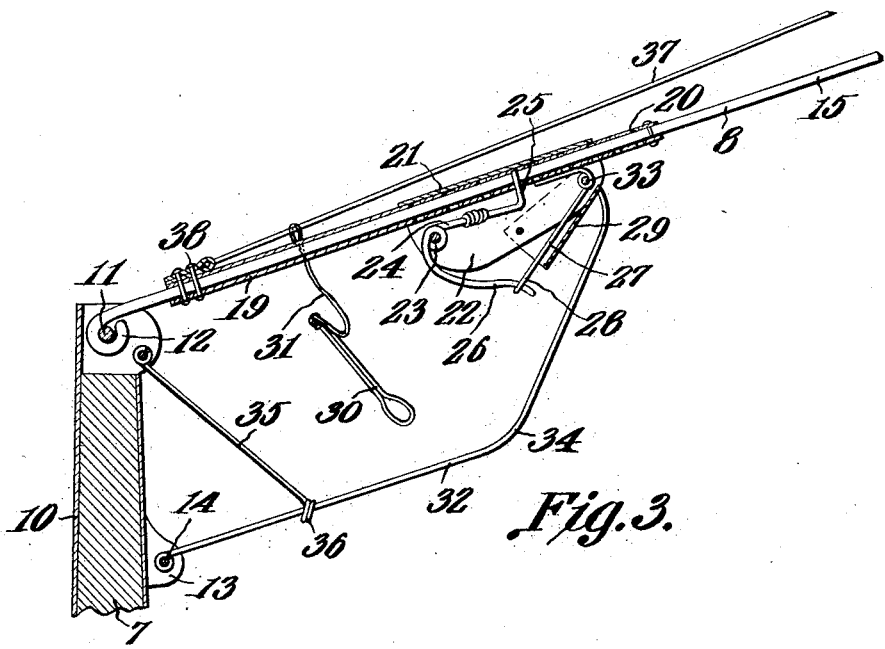
Witnesses
John L. Slatton,
Inventor
by C. A. Snow & Co.
Attorneys

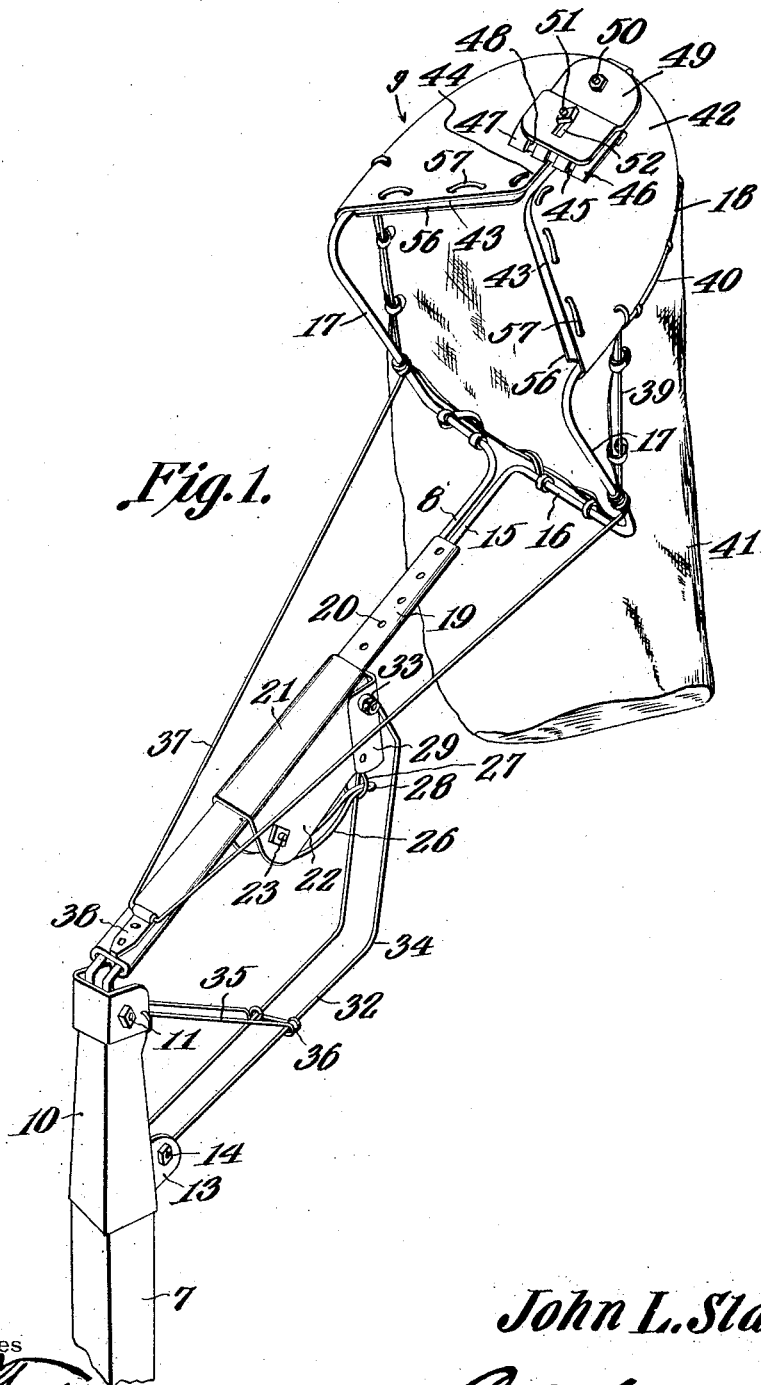

UNITED STATES PATENT OFFICE.

JOHN L. SLATTON, OF BAYPOINT, CALIFORNIA.

FRUIT-HARVESTER.

1,109,645.  Specification of Letters Patent.  Patented Sept. 1, 1914.

Application filed January 12, 1914. Serial No. 811,727.

*To all whom it may concern:*

Be it known that I, JOHN L. SLATTON, a citizen of the United States, residing at Baypoint, in the county of Contra Costa and State of California, have invented a new and useful Fruit-Harvester, of which the following is a specification.

This invention relates to improvements in fruit pickers and harvesters.

An object of the present invention is to provide a fruit harvester which will easily and readily engage the fruit and cut the same from its supporting stem.

A further object is to provide a fruit harvester in which the length of the cut stem of the fruit may be varied and adjusted as desired.

A further object is to provide a fruit harvester in which the harvesting head is and with the harvester so arranged that the stem or supporting twig of the fruit will be directed within a limited channel and the fruit either severed from its supporting stem or may be plucked therefrom and dropped into the conveyer.

A further object is to provide a fruit harvester in which the harvesting head is pivotally secured to the supporting pole and with a sliding attachment secured to the harvester head and pivotally secured to the pole so that the angularity between the harvesting head may be adjusted and also locked in the required adjusted position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in perspective of my improved fruit picker and harvester. Fig. 2 is a detail view in section of a portion of the harvesting head. Fig. 3 is a sectional view of a portion of the harvesting head and the supporting pole and disclosing the adjustable and locking connection between the two. Figs. 4, 5 and 6 are detail views in perspective of the fruit stem severing means whereby the length of the cut stems may be adjusted as desired.

Referring to the drawings in which similar reference numerals designate corresponding parts throughout the several views, 7 is a supporting pole upon the upper extremity of which is pivotally mounted the arm 8 and which latter carries at its outer extremity the harvesting or picking head 9. The supporting pole 7 is provided at its upper extremity with the ferrule or sleeve 10 the upper extremity of which is open and between the side walls thereof extends the pivotal bolt 11. The arm 8 is coiled about the pivotal bolt 11 as at 12 and effects a pivot support therewith allowing the arm 8 to move freely in a vertical plane. The sleeve or ferrule 10 is provided with the outstanding ears 13 adjacent its lower extremity and between which extends the pivotal bolt 14.

The arm 8 which supports the harvesting head 9 as stated, is pivotally secured to the bolt 11 and is adapted to swing in a vertical plane thereabout. The arm 8 is formed of a single length of wire, the extremities 12 of which are coiled about the bolt 11 as illustrated in Fig. 3. The wire rods 15 of which the arm is composed extend parallel for a limited distance forming the said arm, after which they extend in opposite directions as at 16 lying in a horizontal plane. From the outstanding brackets or portions 16 the rods extend upwardly forming the legs 17, after which the rod is bent to form the loop 18 which constitutes a portion of the harvesting head 9.

Secured to and extending around the rods of the arm 8 is the plate 19 which is provided with a plurality of alined apertures 20 and by means of which in connection with certain locking mechanism hereinafter more fully described, the arm is locked in adjusted angular position with respect to the supporting pole 7. Slidably mounted upon the plate 19 is the casing 21 through the side walls 22 of which extends the pivot bolt or pin 23. Pivotally mounted upon the bolt or pin 23 is the latch 24 which includes the hooked end 25 adapted to engage one of the apertures 20 and an upwardly extending arm 26. A spring member 27 is mounted between the side walls of the casing and includes a looped end 28 which fits over the extremity of the arm 26 of the latch and holds the hooked end 25 thereof within one of the apertures 20, thus securely locking the casing against sliding movement upon the plate 19. When it is desired to change the adjustment of the sliding plate, the same may be accomplished by forcibly moving the hooked end 25 of the latch out of engagement with one of the apertures or it may be accomplished by moving the loop 28 of the spring holding member from the end 26 of the latch, thus allowing the said latch to rotate about the pivot 23 and out of engagement with the plate apertures.

A guard 29 extends over the front extremity of the sliding casing 21 and serves as a stop for the spring member 27 and also prevents the accidental disengagement of the spring member 27 from the arm 26 of the latch. In this connection it is to be noted that a looped member 30 is secured by a cord or flexible element 31 to the arm 8 and is adapted to extend through the loop 28, engage the arm 26 and remove or replace the said loop upon the arm. The rear extremity of the sliding casing is prevented from moving upwardly with relation to the plate 19 by the pivot pin 23 and the latch which is secured thereto. The bracket 32 is pivotally secured to the bolt 33 which supports the spring member 27 and is pivotally secured at its opposite extremity to the bolt 14 which extends between the ears 13 of the sleeve. The bracket 32 is formed of rods and is bent intermediate its ends as at 34 which lends a certain amount of resiliency to the bracket and also allows the arm 8 to assume a position substantially in alinement with the pole 7. By reason of the bracket 32 with a given position of the sliding casing, the obliquity of the arm 8 with respect to the pole 7 will be determined. A supporting strut 35 is pivotally secured to the sleeve 10 and is looped around the bracket 32 at its lower extremity and slidably and frictionally engages the same as at 36. The strut 35 tends to strengthen the bracket 32. In order to strengthen the arm 8 the strut rods 37 are provided and are rigidly secured to the upstanding legs 17 at their front extremities and are rigidly secured to the plate 19 by means of the clip 38. By means of these strut rods the arm will be prevented from having undue flexure in a transverse direction. Strut rods 37 are looped about the upstanding legs 17 after which they pass upwardly as at 39 and extend around and are positioned beneath the loop 18 and form a complementary loop 40 therebeneath. The complementary or lower loop 18 forms a support to which the conveyer tube 41 is secured. It is to be noted in this connection that the conveyer 41 may be of any convenient type or may be in the form of a closed bag or basket if it should be so desired. A plate 42 is securely fastened to the loop 18 which extends thereacross and which plate is provided with a V-shaped front edge 43 at the vertex of which extends the slot 44. Thus when the plate is brought into contact with the stem or twig of fruit and the plate moved forcibly thereagainst said branch or stem will be moved centrally by the diverging edges 43 of the plate and will be directed into the slot or channel 44. The slot 44 extends centrally above the conveyer 41 so that if the stem is severed from the fruit while in the slot 44, it will drop directly into the conveyer.

In order to sever the fruit stems after they have been placed within the slot 44 the knife blade 45 is provided and which fits within a suitable casing 46 and which latter is provided with the curled front edge 47 so as to protect the operator against the sharpened edge of the plate 45. The knife blade protector 46 is provided with the centrally arranged slot 48 therein and which slot is arranged in alinement with the slot 44 so that the stem which passes through the slot 44 if moved rearwardly therein will encounter the knife blade 45. At the same time it is to be noted that should the operator's hand come accidentally into contact with the protector 46 it will be prevented from contacting with the blade 45. In order to rigidly hold the knife blade and its protector to the plate 42 and in proper relation to the slot 44, the locking member 49 is provided and is secured at its rear portion by the bolt 50 to the plate 42 and at its front portion by the bolt 51 which extends through a suitable slot 52 in the said locking member and which bolt passes through the central opening 53 within the casing and the notch 54 in the rear of the knife blade. It is to be noted in this connection that the knife blade and protector are provided with a plurality of the openings 53 and with a plurality of slots 48 so that if one portion of the knife blade becomes dull it may be moved to expose a new portion thereof to the slot 44 thus prolonging the useful life of each knife and lengthening the time or interval between the sharpening thereof.

In order to space the knife blade 45 at various distances above the channel 44 so that the length of the stem severed may be adjusted, the washer or spacing member 55 is provided and is also provided with a plurality of slots 48' adapted to register with the slots 48 of the protector and with a plurality of openings 53' adapted to register with the openings 53 of the protector, allowing the bolt 51 to pass therethrough. If it should be desired to pluck the fruit from the stems without severing or scratching the stems the knife blade 45 may be removed and a strip of flexible material inserted in lieu thereof which prevents the stem from contacting with the rear of the slot 44, which protects the stem or twig from becoming scratched or marred. The number of spacers 55 interposed between the blade 45 and the plate 42 may be varied according to the length of the stem which it is required that the fruit retain. The bolt 51 is made of sufficient length to accommodate a plurality of the spacing washers 55 or a longer bolt may be substituted in lieu thereof should it be necessary. The plate 42 is of double thickness and interposed between which and projecting beyond the converging edges 43 is the lining 56 which prevents the fruit or stems from contacting with the metallic plate 42, the advantages of which it is thought will be readily appreciated. The lining 56 is held in place by stitching 57 or other equivalent and suitable means.

The many advantages of the foregoing structure will be apparent and among which it is to be mentioned that the easy manner in which the angularity of the arm 8 and pole 7 may be adjusted is of prime importance. Also the fact that said arm may be locked in any of its adjusted angular positions. A reference to Fig. 2 discloses the fact that the upstanding legs 17 allow the fruit to pass readily therebetween prior to the contacting of the stems with the lining 56, thus rendering the fruit gathering operation a quick and easy procedure. The head 9 is drawn forwardly bringing the converging edges 43 and lining into contact with the stem which forces the stem into the channel where it may be readily severed at the desired length or by drawing the head downwardly with the stem within the channel and the fruit located beneath the plate 42 the fruit will be readily plucked from its supporting stem without marring or scratching the latter, with the result that the fruit will drop into the conveyer and is so harvested.

Having thus fully described my invention, what I claim is:—

1. A harvester comprising a supporting member, an arm pivotally secured thereto and adapted to rotate in a vertical plane, a harvesting head carried by the said arm, a casing slidably mounted upon said arm, a latch carried by said sliding casing adapted to engage the arm and lock at various intervals therealong, a bracket pivotally secured to said sliding casing and said supporting member, holding the arm and supporting member in adjusted angular position predetermined by the position of said sliding casing.

2. A harvester comprising a supporting member, an arm pivotally secured thereto and adapted to rotate in a vertical plane, a harvesting head carried by the said arm, a casing slidably mounted upon said arm, a latch carried by said sliding casing adapted to engage the arm and lock at various intervals therealong, a bracket pivotally secured to said sliding casing and said supporting member, holding the arm and supporting member in adjusted angular position predetermined by the position of said sliding casing, and a strut member pivotally secured to the upper extremity of said supporting member and slidably and frictionally engaging the said bracket.

3. A harvesting head comprising a length of wire being bent to form an arm, the wire at one extremity of said arm projecting in opposite directions and forming outstanding brackets, the brackets at their extremities being bent upwardly and forming upstanding legs, the legs at their extremities being bent to form a loop, a plate carried by said loop, a plucking device carried by said plate adapted to separate the fruit from its supporting branch, and an auxiliary loop positioned beneath the aforementioned loop, and a conveyer carried by said auxiliary loop.

4. A harvesting head comprising a plate provided with diverging edges and with a channel extending rearwardly from a point adjacent the point of convergence of said edges, said diverging edges adapted to direct fruit stems into said channel, means carried by said plate extending across said channel and adapted to sever the stems which contact therewith, and means for spacing the stem severing means at adjustable heights above the said plate to thereby adjust the length of stem severed.

5. A harvesting head comprising a plate provided with diverging edges and with a channel extending rearwardly from a point adjacent the point of convergence of said edges, said diverging edges adapted to direct fruit stems into said channel, means carried by said plate extending across said channel and adapted to sever the stems which contact therewith, and an outstanding lining carried by the diverging edges and slot of said plate, holding the fruit stems out of contact therewith.

6. A fruit harvesting head comprising a plate with a V-shaped notch therein and with a slot extending rearwardly from the apex of said V-shaped notch, a knife blade, a protector therefor, said protector provided with a slot therein registering with the slot of the said plate, means for adjustably locking the knife at various distances above the said plate, and a fruit receiving receptacle positioned beneath said plate and adapted to receive the fruit therein.

7. A harvesting head comprising a plate provided with a V-shaped notch cut therein and with a slot projecting rearwardly from the apex of said V-shaped notch, a knife blade, a knife protector extending therearound, a washer positioned intermediate the knife and protector, and means for securing said protector to said plate with the knife blade and washer, said knife blade adapted to sever the fruit stems entering within said slot, said knife blade removably held by said protector, said knife blade when removed exposing the said washer, said washer holding the fruit stems out of contact with the end wall of the slot and preventing the bruising thereof.

In testimony that I claim the foregoing as my own, I have hereto affixed my signature in the presence of two witnesses.

JOHN L. SLATTON.

Witnesses:
J. G. STERLING,
O. W. CUNNINGHAM.

Copies of this patent may be obtained for five cents each, by addressing the "Commissioner of Patents, Washington, D. C."